United States Patent
Doser

[11] 3,864,808
[45] Feb. 11, 1975

[54] METHOD OF DEFORMING SINTERED MAGNETS WITHOUT SIGNIFICANTLY REDUCING MAGNETIC PROPERTIES

[75] Inventor: Manfred Doser, Edmore, Mich.

[73] Assignee: General Electric Company, Schenectady, N.Y.

[22] Filed: Sept. 6, 1973

[21] Appl. No.: 394,634

[52] U.S. Cl............... 29/420.5, 29/608, 29/DIG. 3, 72/700
[51] Int. Cl............................................. B22f 3/24
[58] Field of Search........ 29/420.5, DIG. 3, DIG.31, 29/608; 72/364, 700

[56] References Cited
UNITED STATES PATENTS

| | | | |
|---|---|---|---|
| 1,768,529 | 6/1930 | Short | 29/DIG. 31 |
| 2,219,423 | 10/1940 | Kurtz | 29/DIG. 31 |
| 2,241,441 | 5/1941 | Bandur | 29/608 |
| 3,428,498 | 2/1969 | Heimke | 29/420.5 X |
| 3,469,433 | 9/1969 | Fresch et al. | 72/364 |
| 3,766,642 | 10/1973 | Schlaudt et al. | 29/420.5 |
| 3,785,038 | 1/1974 | Zapf | 29/420.5 |

FOREIGN PATENTS OR APPLICATIONS 248,095  12/1969  U.S.S.R................ 29/608

*Primary Examiner*—C. W. Lanham
*Assistant Examiner*—D. C. Reiley, III

[57] ABSTRACT

A method of hot-forming aligned sintered magnets. Such magnets are heated to a temperature at which plastic deformation can take place but which is below their sintering temperature. Under such conditions deformation can take place without sufficient magnetic reorientation to bring about a serious reduction in magnetic properties. After heating in the manner described above the magnet is slowly bent in a die over a period of not less than one-half hour to achieve a bending angle of about 90° to produce the desired deformation.

6 Claims, 3 Drawing Figures

METHOD OF DEFORMING SINTERED MAGNETS WITHOUT SIGNIFICANTLY REDUCING MAGNETIC PROPERTIES

BACKGROUND OF THE INVENTION

In powder metallurgy products are fabricated from powders which are shaped to a desired form and then subjected to a sintering step. The sintering step consists of heating the shaped particles to a temperature approaching, but not reaching, the melting point of at least one of the powders in the composition. At the sintering temeprature plastic flow of at least one of the powder components takes place with the result that the shape is stabilized and the product upon cooling is hard and firm. A number of types of magnets are made by such sintering processes. The grains remain discrete magnetically oriented particles in such magnets.

Magnets produced from sintered powders lose desirable magnetic properties when worked. For example, if a flat plate magnet is bent to achieve radial orientation of the magnetic particles the individual crystals are deformed to the detriment of the magnetic properties. The present invention is directed to a method for bending sintered magnets without significantly reducing desired magnetic properties.

SUMMARY OF THE INVENTION

In the present invention a sintered magnetically aligned magnet which is usually in the form of a plate or a barr is heated to a temperature at which plastic deformation can take place but which is below the sintering temperature and, while this temperature is maintained, the magnet is dieformed to the desired shape at a rate slow enough to prevent recrystallization and accompanying misalignment. Radially oriented magnets may be formed in this manner. Typically, a 90° bend is achieved by bending at a uniform rate over a period of about a half-hour.

DESCRIPTION OF THE PREFERRED EMBODIMENT

While the present invention can be applied to sintered materials generally, it is especially beneficial when applied to sintered magnets and particularly magnets of the cobalt-rare earth type. Cobalt-rare earth magnets are well known today because of their high energy product.

The rare earth elements, which will sometimes be abbreviated herein as "RE" or "R", are elements 57–72 of the periodic table. Cobalt-rare earth magnets are composed of particles of intermetallic compounds such as $Co_5R$, $Co_7R_2$ or $Co_{17}R_2$. Sometimes the rare earth is a single element such as samarium but it may also be a mixture of rare earths such as mischmetal. It may also be a mixture of mischmetal and a pure rare earth such as one-half cerium mischmetal and one-half samarium. Preparations of various types of cobalt-rare earth magnets by various methods are disclosed in Benz U.S. Pats. Nos. 3,655,463 and 3,655,464; and Martin U.S. Pats. Nos. 3,682,714, 3,682,715, 3,682,716 and 3,684,591. All of these patents are assigned to the same assignee as the present application and incorporated herein by reference.

Figure 1:
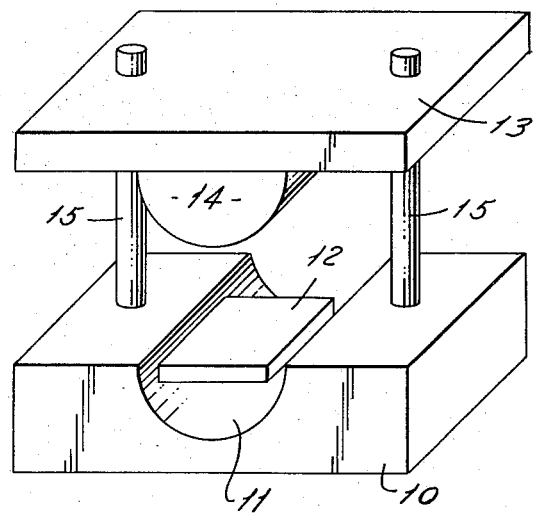
FIG. 1 is a perspective view of the type of apparatus used for bending magnets in accordance with this invention.

The present invention is directed to a method of forming or bending which differs from forging in that much lower pressures and longer times are used. In carrying out the present invention a fixture or apparatus such as is illustrated in FIG. 1 is placed in a furnace (not shown) where it is brought up to temperature in an inert gas atmosphere such as argon. The fixture consists of die 10 having a semi-round cutout 11 in which a magnet 12 is positioned. A forming weight 13 has a semi-cylindrical surface 14 positioned in mating alignment with the semi-round 11. The forming weight 13 is loosely positioned upon a pair of guide pins 15 so that once the semi-cylindrical surface 14 is placed in contact with the magnet 11 the weight of the forming weight 13 will exert a slight pressure on the magnet 11.

In carrying out this invention the fixture of FIG. 1 is brought up to a temperature which is below the melting point of the magnet 12 but at which plastic deformation can take place. The semi-cylindrical surface 14 is brought into contact with the magnet 12 and, in view of the loose fit of the forming weight 13 upon the guide pins 15, the surface 14 exerts a slight pressure on the magnet 12. The weight of the forming weight 13 with surface 14 combination is adjusted to the temperature in such a manner that the bending rate does not create recrystallization. This rate can vary according to composition of the magnet and is usually less than 9° per inch per minute. Preferably, the bending rate is about 3° per inch per minute. Over a period of 30 minutes at this rate, a magnet 12 one inch in length will have been bent through a 90° arc. A pressure not greater than one pound per square inch at the conclusion of the bending is sufficient under normal conditions to accomplish the desired deformation. Frequently a pressure of the order of 0.1 pounds per square inch is sufficient to accomplish the bending.

Figure 2:
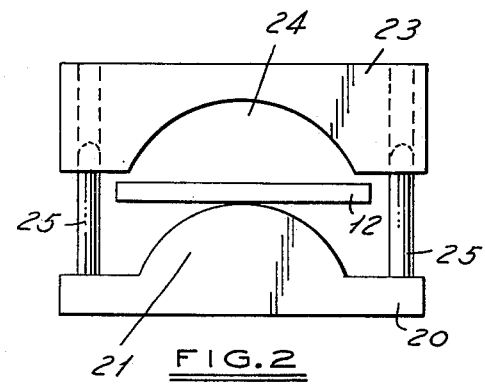
FIG. 2 is a view of an apparatus similar to FIG. 1 in which the functioning parts are inverted with respect to FIG. 1.

FIG. 2 illustrates a bending fixture which is an inverted form of FIG. 1. The magnet 12 of FIG. 2 is bent around a semi-cylindrical surface 21 which is integral with a base 20. A forming weight or die 23 having a shaped trench 24 positioned in mating relationship with the semicylindrical surface 21 is mounted upon a pair of guide pins 25. As in the case of the FIG. 1 embodiment the forming die 23 is loosely positioned upon the pins 25 so that its weight exerts a pressure on the magnet 12 under the high temperature conditions at which the bending takes place.

Figure 3:
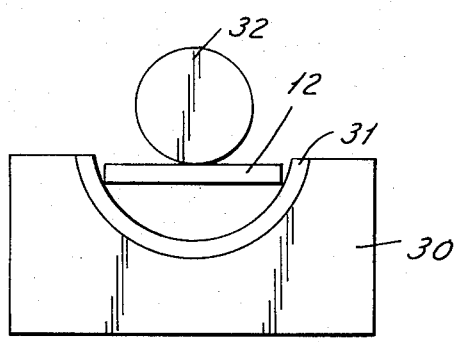
FIG. 3 illustrates an alternative form of bending apparatus.

The fixture of FIG. 3 is similar in action to the fixture of FIG. 1. However, in this embodiment the die member consists of a ceramic packing mold 30 having a liner 31 of stainless steel which forms a semi-round trench in which the magnet 12 is positioned. Pressure is maintained on the magnet 12 by a solid cylindrical rod 32 in contact with the surface of the magnet 12. Of course, the rod 32 may have a curved surface which is not cylindrical where a nonuniformly curved magnet surface is desired.

Normally, the magnets used in the practice of this invention have the bar or plate shape illustrated in the drawing. Magnets having a length of no greater than two inches have been bent into a 90° arc without significantly reducing their magnetic properties. Longer magnets have been bent in accordance with this invention without significantly reducing their magnetic properties.

The temperature at which bending takes place depends upon the composition of the magnet. In the case of CoRE magnets the preferred temperature range is 900° to 1,150°C for $Co_5Sm$. For a $Co_5MM$ (mischmetal) system it is 700°–1,000°C. For a $Co_5Sm_{0.5}MM_{0.5}$ magnet it is 700°–1,070°C.

While the invention has been described with reference to certain embodiments, it is obvious that there may be variations which fall properly within the scope of the invention. Accordingly, the invention should be limited in scope only as may be necessitated by the scope of the appended claims.

What I claim as new and desire to secure by letters patent of the United States is:

1. The method of forming a sintered magnet produced from powdered metal into various shapes by plastic deformation without significantly reducing desired magnetic properties which comprises:

heating said magnet to a temperature below the melting temperature but at a temperature at which plastic deformation can take place, and, while maintaining said temperature, die-forming said magnet at a rate slow enough to prevent recrystallization.

2. The method of claim 1 in which the sintered magnet is a cobalt-rare earth magnet.

3. The method of claim 2 in which the sintered magnet is in the form of an elongated bar.

4. The method of bending a cobalt-rare earth flat magnet without significantly reducing desired magnetic properties which comprises:

heating said magnet to a temperature below its melting temperature but at which plastic deformation takes place;

and die-bending said magnet at a rate not exceeding about 9° per inch per minute.

5. The method of claim 4 wherein the bending rate is about 3° per inch per minute.

6. The method of claim 4 wherein the die-bending takes place at a temperature between 700°C to 1,150°C.

* * * * *